(12) United States Patent
Chopra et al.

(10) Patent No.: US 11,829,628 B2
(45) Date of Patent: Nov. 28, 2023

(54) BACKUP MONITORING FOR PREDICTIVE STORAGE POLICY SELECTION FOR A CLOUD-BASED STORAGE

(71) Applicant: EMC IP Holding Company LLC, Hopkinton, MA (US)

(72) Inventors: Shelesh Chopra, Bangalore (IN); Sunil Yadav, Bangalore (IN); Amarendra Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 17/481,629

(22) Filed: Sep. 22, 2021

(65) Prior Publication Data
US 2023/0093496 A1 Mar. 23, 2023

(51) Int. Cl.
 *G06F 3/00* (2006.01)
 *G06F 3/06* (2006.01)
 *G06F 16/245* (2019.01)
 *G06F 9/54* (2006.01)

(52) U.S. Cl.
 CPC .............. *G06F 3/065* (2013.01); *G06F 3/067* (2013.01); *G06F 3/0619* (2013.01); *G06F 9/541* (2013.01); *G06F 16/245* (2019.01)

(58) Field of Classification Search
 None
 See application file for complete search history.

(56) References Cited

U.S. PATENT DOCUMENTS

| | | | |
|---|---|---|---|
| 2013/0007402 A1* | 1/2013 | Prahlad | G06F 16/185 711/170 |
| 2022/0245034 A1* | 8/2022 | Nara | G06F 11/1461 |

* cited by examiner

*Primary Examiner* — Midys Rojas
(74) *Attorney, Agent, or Firm* — Dergosits & Noah LLP; Todd A. Noah (57) ABSTRACT

Described is a system for predictive storage policy selection for a cloud-based storage based on backup monitoring. The system may reduce storage costs incurred by a subscriber of a backup service that leverages a cloud-based storage. The system may monitor backup operations and collect backup statistics associated with the resource requirements of performing a backup to a cloud-based storage. To collect such information, the system may execute a specialized monitoring process that works in conjunction with a backup application and/or server. The collected information may be stored as part of a metadata database associated with the object storage. Accordingly, the system may retrieve the information from the metadata database to predict storage costs associated with performing future backup operations. Based on the predicted storage costs, the system may automatically select an appropriate storage policy.

20 Claims, 4 Drawing Sheets

BACKUP MONITORING FOR PREDICTIVE STORAGE POLICY SELECTION FOR A CLOUD-BASED STORAGE

TECHNICAL FIELD

This disclosure relates to cloud-based storage systems, and more particularly, managing backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on such cloud-based storages to leverage the benefits such as cost efficiency (e.g., pay per usage models) and scalability. These cloud-based systems may implement an object-based storage architecture, and accordingly, client data such as backup data may be stored as objects (or data objects). To limit the amount of data transferred during a backup procedure, the client data may be stored to an object storage using incremental backups. For example, only the changes to the client data since the previous backup will be stored as part of the incremental backup. Despite implementing an incremental backup infrastructure, enterprise clients still require large amounts of data to be offloaded to the cloud. Accordingly, even minor changes to a storage policy may yield substantial cost savings to clients. Although cloud storage providers provide the ability to manage storage costs, the native capabilities (or tools) provided by cloud storages are often rudimentary. Moreover, such native capabilities may not adequately address constantly changing data storage requirements. Accordingly, there is a continued need to efficiently monitor storage costs and select appropriate storage policies when storing backup data to a cloud-based object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for predictive storage policy selection for a cloud-based storage based on backup monitoring. In some embodiments, the system may reduce storage costs incurred by a client (e.g., subscriber) of a backup and data protection service that leverages a cloud-based storage. The system may monitor backup operations and collect specialized metadata associated with performing a backup to a cloud-based storage. In some embodiments, the specialized metadata may include backup statistics related to the resource requirements of performing a backup. These statistics may include information related to the number of storage API calls, the number of objects created, the amount of data transferred, the time required to perform a backup, and various other statistics that may impact to storage costs associated with utilizing a cloud-based storage service. To collect such information, the system may execute a specialized monitoring process that works in conjunction with a backup application and/or server. In some embodiments, the collected information may be stored as part of a metadata database associated with the object storage. Accordingly, the system may retrieve the information from the metadata database to predict storage costs associated with performing future backup operations. Based on the predicted storage costs, the system may select an appropriate storage policy for the cloud-based storage. As a result, the system may efficiently reduce storage costs for a backup infrastructure that relies on a cloud-based storage.

As referred to herein, a storage policy (or pricing plan) may define the pricing rate scheme incurred by a client (e.g., customer) of a cloud-based storage based on the usage of various cloud resources (or components). For example, the storage policy may have costs associated with the amount of storage used on the object storage, the storage tier to which data is stored, the number of requests and data retrievals from the object storage, the amount of data retrieved to and from the object storage, and other tools such as analytics tools. Accordingly, different storage polices may have different pricing schemes (e.g., predetermined rates) for these various resources (or components). As a result, by selecting the most suitable storage policy, or creating a customized policy, based on usage may provide significant cost savings to a client.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g., Solid State Drive (SSD), Hard Disk Drive (HDD)), which may include storage systems provided by a cloud service provider.

Figure 1:
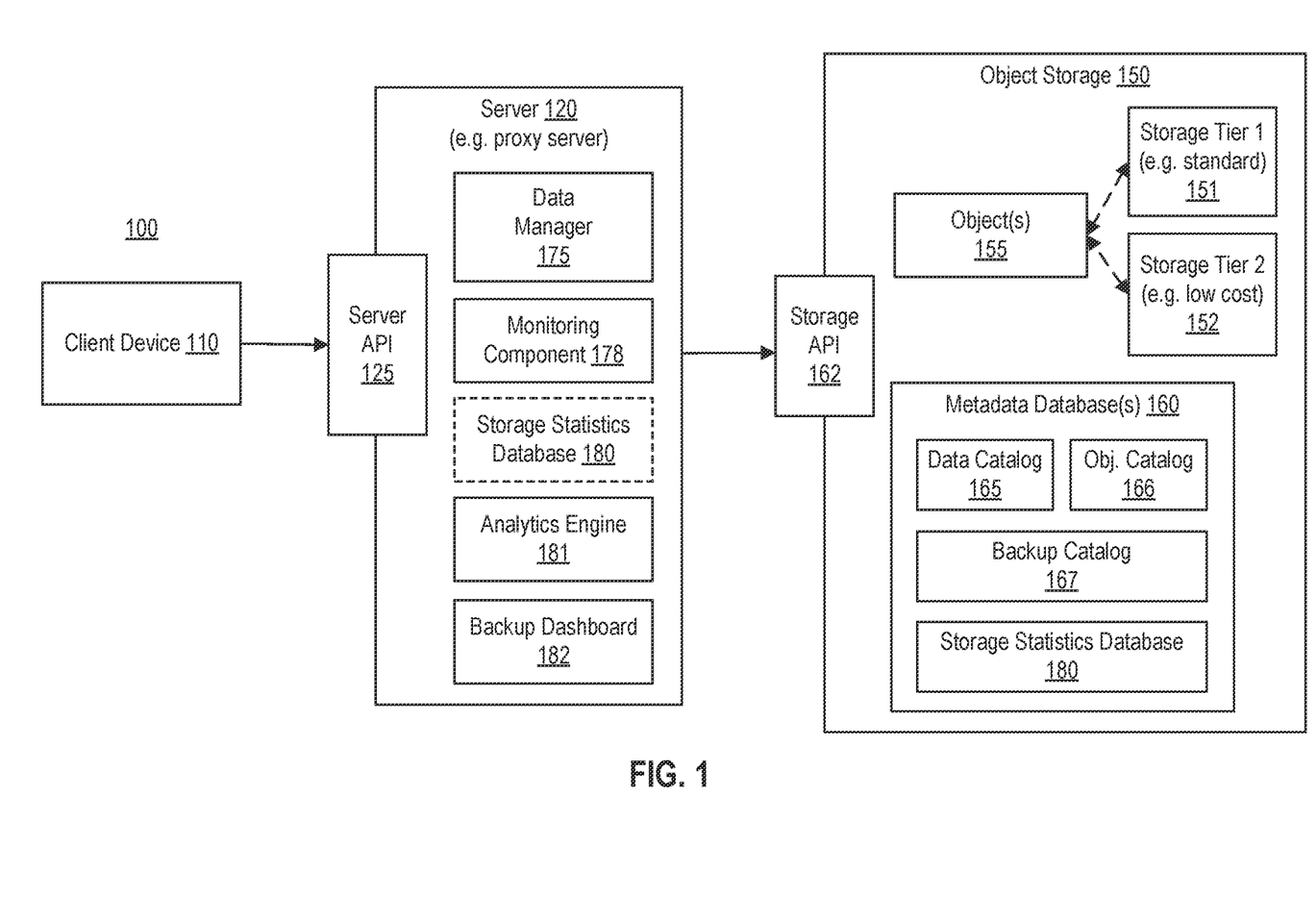
FIG. 1 is a block diagram illustrating an example of an operating environment that may be used in conjunction with one or more embodiments of the disclosure.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g., a cloud-based component/gateway and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g., software/platform-as-a-service) provided by a first entity, as well as a customer of an object storage or service (e.g., software/platform-as-a-service) provided by a different (or second) entity. For example, the server 120 may be provided as part of the backup service provided by the first entity (e.g., Dell EMC), and the object storage 150 may be provided as part of a cloud-based object storage service provided by the different entity (e.g., Amazon S3, Microsoft Azure, IBM Cloud Object Storage, Google Cloud Storage, etc.). Accordingly, the customer of a backup service may be associated with a backup account of the backup service. In some embodiments, the first entity providing the backup service may also provide (or host) the client device 110 (e.g., as part of a VM).

The client device (or client system) 110 may be associated with client data (or data) that is backed up to the object storage 150 via a backup account. The object storage (or object storage system) 150 may include a persistent object storage that implements a storage architecture that manages data as an object(s) 155. For example, each object 155 stored by the object storage 150 may include data, meta-data, and/or a globally unique identifier for the object. In some embodiments, an object may include a unit of storage used by a cloud-based object storage and may include a collection of objects that may be referred to as containers, buckets, and the like (e.g., depending on the cloud-based storage provider). For example, these containers or buckets may be associated with a policy that determines what actions can be performed in association with the objects stored therein. As shown, the object storage 150 may include various storage tiers including storage tier 1 151, and storage tier 2 152. Accordingly, objects 155 (e.g., backed up client data) may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g., GB/month), retrieval costs, performance costs, etc. For instance, higher performance tiers may be associated with increased costs. For example, storage tier 1 151 may be a standard (or high performance) storage tier that is associated with a first storage cost (or cost per unit of storage), and storage tier 2 152 may be an archival or low-cost storage tier that is associated with a second storage cost (or cost per unit of storage). For example, the storage cost (e.g., GB/month) associated with storage tier 2 152 may be lower than the storage cost associated with storage tier 1 151. Thus, efficiently storing data on a lower tier storage may provide substantial cost savings to a subscriber (e.g., a backup service provider, or user) of the cloud-based storage service. For example, storage tier 1 151 may have a cost of 2.3 cents (or $0.023) per GB/month, while storage tier 2 152 may have a cost of 0.4 cents (or $0.004) per GB/month. Accordingly, re-tiering data to storage tier 2 152 would result in a significant reduction in storage costs. It should be noted that other storage costs (or fees) such as access fees or bandwidth fees may also be reduced using a lower cost storage tier. In addition, although only two storage tiers are shown, additional storage tiers with varying costs are also contemplated.

The client device 110 may use the server 120 as an intermediary for managing client backup data stored on the object storage 150. In some embodiments, the server 120 may include, or work in conjunction with, various backup components (e.g., products) that can perform backup operations across physical and virtual environments. These backup components (e.g., backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g., firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g., as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server application programming interface (API) 125. The server 120 may then initiate (or perform, execute, etc.) a corresponding storage operation directly on the object storage using the storage API 162. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. In some embodiments, the server API 125 may include operations for deleting and/or re-tiering data (e.g., objects) stored on the object storage 150. For example, a re-tiering operation may move an object from a first storage tier (e.g., storage tier 1 151) to a second (or lower) storage tier (e.g., storage tier 2 152). It should be noted that the same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 162. In some embodiments, the storage API 162 may include only a standard set of storage operations. Accordingly, the server 120 may implement efficient storage and recovery procedures as further described herein.

As described, the server 120 may manage backed-up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing backup data. For example, the user interface may allow a user to configure (e.g., input) various settings such as a garbage collection schedule. In addition, the data manager 175 may direct (or control, initiate, etc.) other components of the operating environment 100 to perform various processes as further described herein.

As described, a monitoring component 178 may work in conjunction with the server 120 and/or object storage to collect various storage statistics associated with performing a backup. In some embodiments, the monitoring component 178 may be a process (or service, daemon, etc.) that executes on the server 120 or object storage 150. For example, the monitoring component 178 may execute during a backup operation to collect information on the number of storage API 162 calls required to backup data on the object storage 150. As another example, the monitoring component 178 may execute during a backup operation to collect information on the amount of storage used, transmitted, or received from the object storage during a backup (or recovery) process.

A storage statistics database 180 may store the storage statistics collected by the monitoring component 178. In some embodiments, this information may be metadata, and thus, the storage statistics database 180 may be part of, or work in conjunction with, the metadata database 160 that is maintained by the object storage 150. However, as shown, the database 180 (or an instance thereof) may also be stored as part of the server 120 (e.g., via a cache memory). As further described herein, components of the server 120 (e.g., analytics engine 181) may access databases 180 and/or 160 to retrieve information as part of a process to predict storage costs associated with a backup account.

An analytics engine 181 may perform predictive analysis by retrieving and processing the storage statistics (e.g., metadata) stored in database 180. The analytics engine 181 may process this information using a machine learning technique to predict resource and cost requirements for future backups. Accordingly, the analysis may include predicting (or approximating, performing a heuristic, etc.) backup costs associated with performing future backups based on various storage policies. Accordingly, the analytics engine 181 may provide various options (or recommendations) for selecting a storage policy for a backup account. In some embodiments, the analytics engine 181 may automatically select or create a storage policy based on the analysis.

A backup dashboard 182 may include an interface that provides various information to a user (e.g., backup administrator associated with the backup account). This information may include results from the processing of the statistics performed by the analytics engine 181. This information may be displayed by the dashboard 182 as further described herein. The dashboard 182 may also allow a user to modify the storage policy of a backup account. For example, a user associated with the backup account may submit a request, via the dashboard 182, to update a storage policy. In response, the analytics engine 181 may retrieve statistics collected by the monitoring component 178 that are stored in database 180, and automatically select a storage policy that reduces potential costs incurred by the backup account going forward. Accordingly, the user may confirm or select a different storage policy provided (e.g., recommended) by the system via the dashboard 182.

To further improve potential storage and recovery efficiency, the server 120 may leverage a specialized metadata database 160. As described, the metadata database may store the collected storage statistics. The metadata database 160 may be maintained by the server 120. The metadata database 160 may include an embedded database. For example, the metadata database 160 may be created by the server 120 using a particular software library (e.g., SQLite library). The metadata database 160 may reside on the object storage 150, the server 120, and/or another component (e.g., cloud-based component) such that it is accessible by the server 120. For example, when the metadata database 160 resides on the object storage 150, the server 120 may access (e.g., update) the metadata database 160 by accessing the storage API 162. In addition, portions of the metadata database may be cached on a memory (or storage) of the server 120 to further improve performance of various backup or restore operations.

In addition to the storage statistics, the metadata database 160 may store metadata associated with client data stored on the client device 110 and/or backed up to the object storage 150. The metadata database 160 may also store various types of backup information associated with the backed-up client data and/or backups performed.

The metadata database 160 may include a data catalog (or table, database, index, etc.) 165. The data catalog 165 may store information associated with the data stored as part of each backup. For example, the information may include a point-in-time the client data was backed up, a storage location of the backed-up client data (including storage tier), an object ID to which the backed-up client data is stored, whether the data has been committed, and various other types of information. Accordingly, a data catalog 165 (or instance thereof) may be updated after each backup is performed. In some embodiments, the data catalog 165 may be maintained for a particular account (e.g., user, client, customer, etc.) associated with the object storage 150. The data catalog 165 may also store various types of backup information associated with the backed-up client data.

The metadata database 160 may include an object catalog (or table, database, index, etc.) 166 that stores information associated with the objects 155. For example, the information may include the point-in-time the object was created, data such as data IDs of backup data stored by the object, data offsets of data stored within the object, a storage location of the object, and other types of information that may be associated with an object such as the earliest and latest backup that references a particular object as further described herein.

The metadata database 160 may also include a backup catalog (or index, table, database, etc.) 167 that stores information associated with each backup performed to the object storage 150. For example, the backup catalog 167 may include backup times specifying when each backup was performed, a backup expiration time, a type of backup (e.g., full or incremental), whether the backup was a success or failure, the amount of data that was stored before the backup failed, and any other information that may be associated with performing a backup. In addition, the backup catalog 167 may also include a list of objects required to perform a full restore to each of the backup times.

Figure 2:
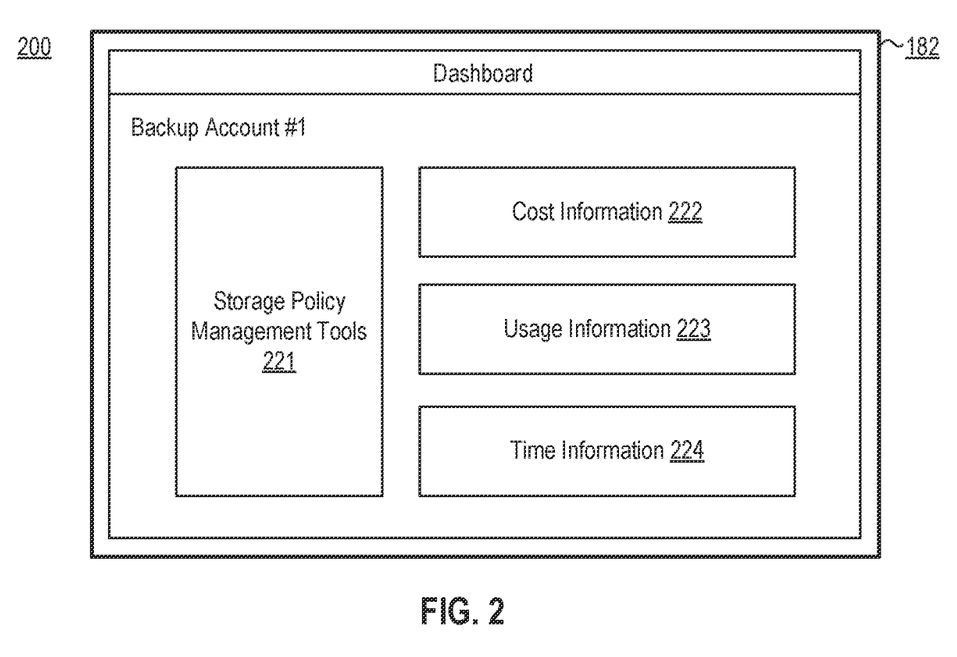
FIG. 2 is a block diagram illustrating an example interface for a system that provides storage policy selection for a cloud-based storage according to one or more embodiments of the disclosure.

FIG. 2 is a block diagram 200 illustrating an example interface for a system that provides storage policy selection for a cloud-based storage according to one or more embodiments of the disclosure. The backup dashboard 182 may provide an interface that may be used in conjunction with the system. As shown, the backup dashboard 182 may include various sections (or elements, components, etc.) to display various types of information. This information may provide the ability for a user to select a storage policy and define related configuration settings (or options). In addition, the backup dashboard 182 may provide various types of information, which may be provided in real-time (e.g., dynamically). As shown, the backup dashboard 182 may include storage policy management tools 221, cost information 222, usage information 223, and time information 224, and various other sections (not shown) that may provide information or tools associated with a backup procedure and/or cloud-based storage usage.

The storage policy management tools 221 may allow a user to manage one or more storage polices (e.g., pricing plans) associated with a particular backup account. The storage policy management tools 221 may allow a user to view information regarding a current storage policy, and provide options for updating the current storage policy. For example, the user may be able to view a list of the available storage policies and their associated storage costs. For instance, the user may be able to view pricing (e.g., predetermined rates) for various resources under each storage policy. The storage policy management tools 221 may also allow a user to select or confirm a storage policy provided (or recommended) by the system. For example, a user may submit a request to select a new (or initial) storage policy for a backup account. In response, the system may perform an analysis of the storage statistics to predict the future costs to perform backups under each of the available policies, and provide the storage policy with the lowest anticipated cost. The user may then confirm that the backup account be associated with (e.g., subscribe to) the provided storage policy. As another example, after performing an analysis, the system may provide a list of different storage polices and their associated costs thereby allowing the user to select amongst the list of polices. In addition, this list of policies may be narrowed down to a set of recommended policies based on cost (e.g., top 5 polices based on cost). In addition, in some embodiments, an object storage may provide the ability to create a storage policy. Accordingly, in such scenarios, the system may provide an auto-created storage policy based on predicted storage costs.

The backup dashboard 182 may also provide cost information 222 that displays real-time costs accrued and/or predicted based on the current storage policies or a recommended storage policy. For example, the system may provide various rates for particular resources (e.g., cost/GB of storage, cost/1000s of API requests, storage tier pricing, etc.). The backup dashboard 182 may also include usage information 223 that displays real-time storage usage. For example, the system may provide the amount of total storage used, storage used per backup, the total number of objects, the number of objects per backup, and any other storage-related information.

The backup dashboard 182 may also include time information 224 that displays information regarding the duration of a backup, the progress of the backup, and other time-related information.

Accordingly, the backup dashboard 182 provides an efficient mechanism to display real-time backup information and the ability to manage a storage policy associated with a backup account.

Figure 3:
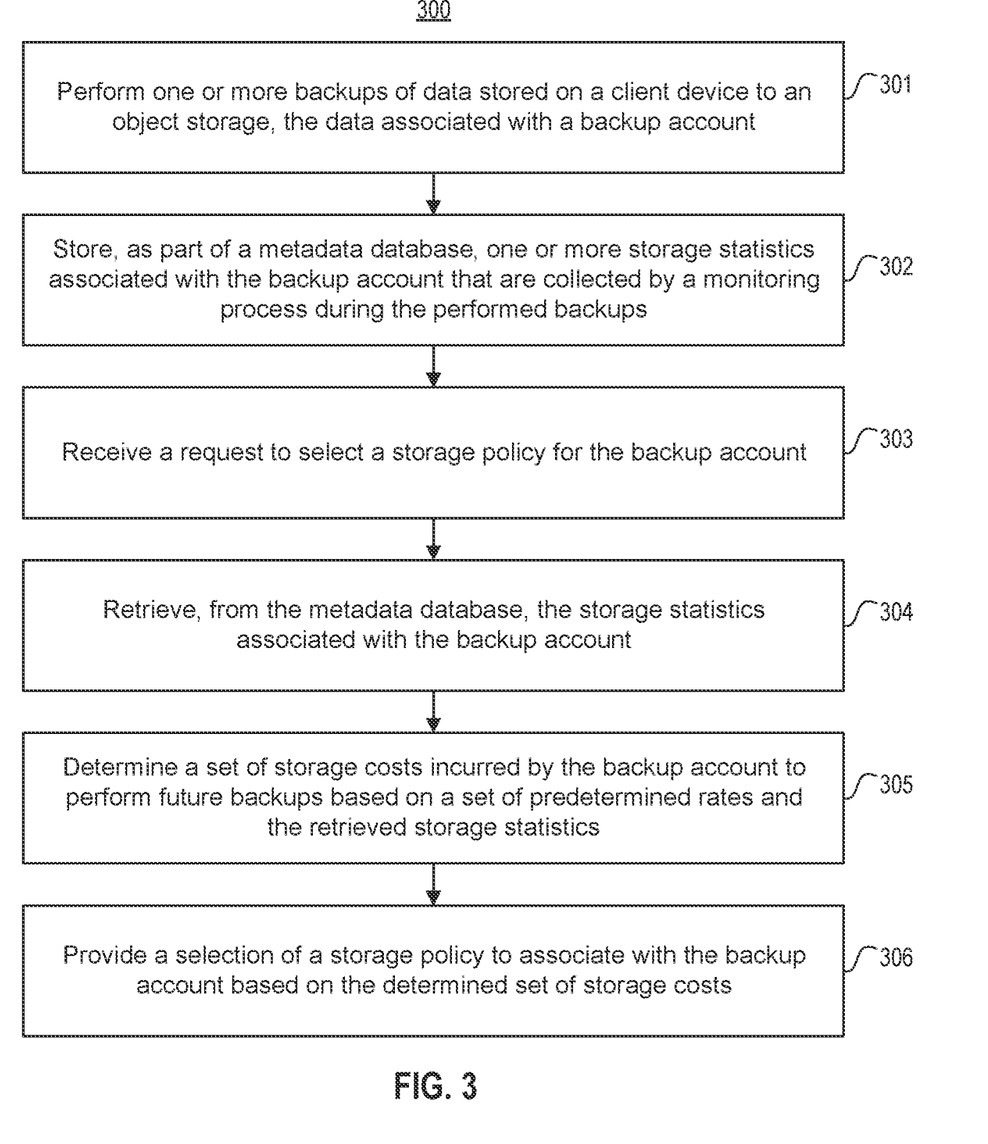
FIG. 3 is a flow diagram illustrating an example method of selecting a storage policy by determining storage costs associated with performing a backup according to one or more embodiments of the disclosure.

FIG. 3 is a flow diagram illustrating an example method of selecting a storage policy by determining storage costs associated with performing a backup according to one or more embodiments of the disclosure. Process 300 may use processing logic, which may include software, hardware, or a combination thereof. For example, process 300 may be performed by a system including one or more components described in operating environment 100 (e.g., one or more components of server 120).

In 301, the system (e.g., server 120) may perform one or more backups of data stored on a client device (e.g., client device 110) to an object storage (e.g., object storage 150). The data may be associated with a backup account. As described, the backups may include full and incremental backups. In some embodiments, performing the one or more backups may include the system accessing an API (e.g., storage API 162) provided by the object storage to store the data within one or more objects (e.g., objects 155) of the object storage.

In 302, the system may store one or more storage statistics associated with the backup account that are collected (or captured, determined, retrieved, stored, etc.) by a monitoring process (e.g., monitoring component 178) during the performed backups. In some embodiments, the storage statistics may be stored as part of a metadata database (e.g., metadata database 160). In some embodiments, the backups may be performed by a backup server (e.g., server 120) that communicates with the object storage, and the monitoring process may execute on the backup server during the backups. For example, the monitoring process may execute as a background process during a backup operation performed by the backup server. However, in some embodiments, the monitoring process may execute on the object storage. In some embodiments, the monitoring process may execute during the performance of the backup, and accordingly, can capture and provide real-time storage information. For example, the monitoring process may provide real-time information to a user via an interface (e.g., backup dashboard 182).

In 303, the system may receive a request to select a storage policy for the backup account. In some embodiments, the request may be provided by a user associated with the backup account. For example, the user may interact with the backup dashboard (e.g., dashboard 182) including selecting an option to update (or modify, select, list, etc.) a storage policy for the backup account. For example, the user may want to select a policy, amongst a set of storage policies, that minimizes the costs associated with performing a backup. As another example, the user may select a customized storage policy that is created specifically for the backup account (e.g., backup-account-specific) based on information collected for previous backups.

In 304, the system may retrieve the storage statistics associated with the backup account. In some embodiments, the system may retrieve the statistics from the metadata database. In some embodiments, the system may retrieve the statistics in response to receiving the request to select a storage policy. For example, the statistics may be retrieved in real-time after receiving the request.

In 305, the system may determine (or predict, approximate, etc.) a set of storage costs incurred by the backup account to perform future backups based on a set of predetermined rates and the retrieved storage statistics. In other words, in some embodiments, the system may predict storage costs for future backups by performing a calculation based on previous backup costs. For example, the system may calculate a storage cost by predicting a particular resource usage by processing the retrieved statistics, and then multiplying the predicted usage by a corresponding rate.

As described, the system may determine various storage costs that may be based on different types of used storage resources and the corresponding rates charged by a cloud storage providers for such resources.

In some embodiments, the one or more storage statistics may include a number of calls to the API per backup, and thus, determining the set of storage costs may include approximating a cost to perform the future backups based on the number of API calls. For example, the system may retrieve historical API call statistics from the metadata database and process the API call statistics (e.g., via a machine learning model) to predict the number of API calls required to perform future backups (e.g., an average number of API calls per future backups). The system may then multiply the predicted number of API calls by an API call cost rate of the object storage (e.g., cost per 1000 API calls) to determine a storage cost associated with API calls.

In some embodiments, the one or more storage statistics may include a number of objects created per backup, and thus, determining the set of storage costs may include approximating a cost to perform the future backups based on the number of objects created. For example, the system may retrieve historical object creation statistics from the metadata database for processing to predict the number of objects required to perform future backups (e.g., an average number of objects created per future backups). The system may then multiply the predicted number of objects by a cost per object rate to determine a storage cost associated with creating objects.

As another example, the system may retrieve historical storage amount statistics from the metadata database for processing to predict the amount of storage required to perform future backups. The system may then multiply the predicted amount of storage a storage cost rate (e.g., cost per GB of data) to determine a storage cost.

As yet another example, the system may retrieve historical data retrieval statistics from the metadata database for processing to predict the amount of data retrieval required to perform future restores. The system may then multiply the predicted amount of data retrieval by a retrieval cost rate (e.g., cost per GB of data retrieval) to determine a storage cost.

In some embodiments, the one or more storage statistics may include a time of day the backups are performed, and thus, determining the set of storage costs may include approximating a cost to perform the future backups based on the time of day the backups are performed.

In 306, the system may provide a selection of a storage policy to associate with the backup account based on the determined set of storage costs. In some embodiments, the system may select a storage policy amongst a set of storage polices. For example, the object storage and/or the backup service may have various storage policies with various pricing rates. For instance, a storage policy may be based on the total amount of storage used per month. As another example, a storage policy may include more granular charges including charges for the number API calls, the amount of objects created, the amount of storage used, the amount of data transferred to or from the object storage, a storage tier used, and other costs including different rates based on the time of day (e.g., surcharge during peak hours). Accordingly, based on the determined storage costs, the system may determine (or predict, approximate, etc.) cumulative (or total) costs incurred by a backup account under various storage policies. The system may then provide the storage policy with the predicted lowest cost for the backup account. Alternatively, the system may provide a listing of storage polices along with the predicted costs for the backup account. When providing the storage polices, the system may provide a user the ability to select the particular storage policy via an interface such as the backup dashboard. The system may then receive a confirmation from a user associated with the backup account before implemented the selected storage policy. In some embodiments, the storage policy may also schedule backups at a particular time based on rates.

In some embodiments, when selecting a storage policy, the system may retrieve storage policy information from the object storage. For example, the system may retrieve real-time storage policies from the object storage in response to receiving the request to select a storage policy. In other words, the selection of a storage policy may be done in dynamically such that a storage policy may be selected based on pricing at the time of the request. For example, object storages may continually update its storage policies (e.g., predetermined rates), and accordingly, the system may account for such changes by processing the storage statistics and selecting a storage policy at the time of the request (e.g., in real-time). As described, in some embodiments, the request to select the storage policy may be received via an interface associated with (e.g., provided by) a backup service, and the selection of the policy to associate with the backup account may be provided to the interface for confirmation by a user.

Figure 4:
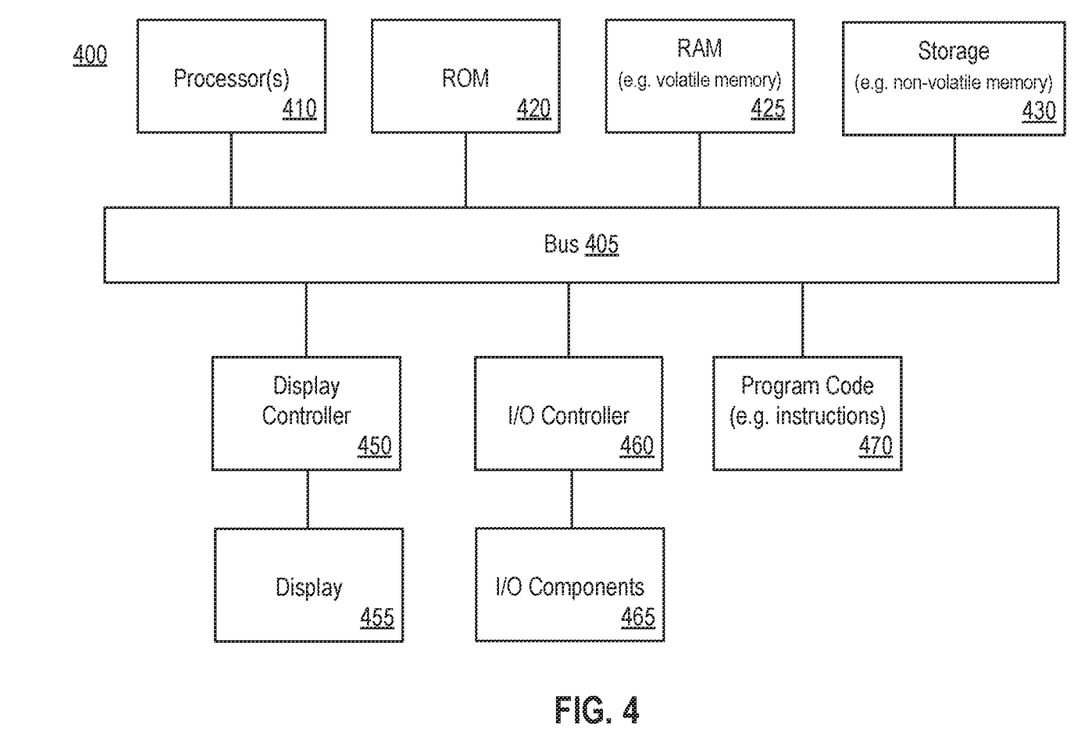
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g., server 120, client device 110, object storage 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g., within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g., within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g., accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g., server 120, manager 175, component 178, engine 181, dashboard 182, etc.). Program code 470 may reside, completely or at least partially, within the memories described herein (e.g., non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g., any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g., and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   perform one or more backups of data stored on a client device to an object storage, the data associated with a backup account;
   store, as part of a metadata database, one or more storage statistics associated with the backup account that are collected by a monitoring process during the performed backups;
   receive a request to select a storage policy for the backup account;
   retrieve, from the metadata database, the storage statistics associated with the backup account;
   predict a plurality of total storage costs, each of which could be incurred by the backup account during a performed future backup, based on a corresponding plurality of storage policies, each comprising a corresponding set of resource pricing rates and the retrieved storage statistics, comprising backup resources usage associated with the backup account; and
   enable a selection of a storage policy, of the plurality of storage policies, to associate with the backup account, by outputting at least some of the plurality of storage policies and a corresponding plurality of predicted total storage costs via a user interface.

2. The system of claim 1, wherein performing the one or more backups includes accessing an application programming interface (API) provided by the object storage to store the data within one or more objects of the object storage.

3. The system of claim 2, wherein the one or more storage statistics include a number of calls to the API per backup, and predicting the plurality of total storage costs includes approximating a cost to perform the future backup based on the number of calls.

4. The system of claim 1, wherein the one or more storage statistics include a number of objects created per backup, and predicting the plurality of total storage costs includes approximating a cost to perform the future backup based on the number of objects created.

5. The system of claim 1, wherein the selection of the storage policy is automatically provided in response to receiving the request to select the storage policy for the backup account.

6. The system of claim 1, wherein the backups are performed by a backup server that communicates with the object storage, and the monitoring process executes on the backup server during the backups.

7. The system of claim 1, wherein the one or more storage statistics include a time of day the backups are performed, and predicting the plurality of total storage costs includes approximating a cost to perform the future backup based on the time of day the backups are performed.

8. The system of claim 1, wherein the request to select the storage policy is received via an interface associated with a backup service, and the selection of the policy to associate with the backup account is provided to the interface for confirmation by a user.

9. A method comprising:
   performing one or more backups of data stored on a client device to an object storage, the data associated with a backup account;
   storing, as part of a metadata database, one or more storage statistics associated with the backup account that are collected by a monitoring process during the performed backups;
   receiving a request to select a storage policy for the backup account;
   retrieving, from the metadata database, the storage statistics associated with the backup account;
   predicting a plurality of total storage costs, each of which could be incurred by the backup account during a performed future backup, based on a corresponding plurality of storage policies, each comprising a corresponding set of resource pricing rates and the retrieved storage statistics, comprising backup resources usage associated with the backup account; and
   enabling a selection of a storage policy, of the plurality of storage policies, to associate with the backup account, by outputting at least some of the plurality of storage policies and a corresponding plurality of predicted total storage costs via a user interface.

10. The method of claim 9, wherein performing the one or more backups includes accessing an application programming interface (API) provided by the object storage to store the data within one or more objects of the object storage.

11. The method of claim 10, wherein the one or more storage statistics include a number of calls to the API per backup, and predicting the plurality of total storage costs includes approximating a cost to perform the future backup based on the number of calls.

12. The method of claim 9, wherein the one or more storage statistics include a number of objects created per backup, and predicting the plurality of total storage costs includes approximating a cost to perform the future backup based on the number of objects created.

13. The method of claim 9, wherein the selection of the storage policy is automatically provided in response to receiving the request to select the storage policy for the backup account.

14. The method of claim 9, wherein the backups are performed by a backup server that communicates with the object storage, and the monitoring process executes on the backup server during the backups.

15. A computer program product comprising a non-transitory computer-readable medium having a computer-readable program code embodied therein to be executed by one or more processors, the program code including instructions to:
perform one or more backups of data stored on a client device to an object storage, the data associated with a backup account;
store, as part of a metadata database, one or more storage statistics associated with the backup account that are collected by a monitoring process during the performed backups;
receive a request to select a storage policy for the backup account;
retrieve, from the metadata database, the storage statistics associated with the backup account;
predict a plurality of total storage costs, each of which could be incurred by the backup account during a performed future backup, based on a corresponding plurality of storage policies, each comprising a corresponding set of resource pricing rates and the retrieved storage statistics, comprising backup resources usage associated with the backup account; and
enable a selection of a storage policy, of the plurality of storage policies, to associate with the backup account, by outputting at least some of the plurality of storage policies and a corresponding plurality of predicted total storage costs via a user interface.

16. The computer program product of claim 15, wherein performing the one or more backups includes accessing an application programming interface (API) provided by the object storage to store the data within one or more objects of the object storage.

17. The computer program product of claim 16, wherein the one or more storage statistics include a number of calls to the API per backup, and predicting the plurality of total storage costs includes approximating a cost to perform the future backup based on the number of calls.

18. The computer program product of claim 15, wherein the one or more storage statistics include a number of objects created per backup, and predicting the plurality of total storage costs includes approximating a cost to perform the future backup based on the number of objects created.

19. The computer program product of claim 15, wherein the selection of the storage policy is automatically provided in response to receiving the request to select the storage policy for the backup account.

20. The computer program product of claim 15, wherein the backups are performed by a backup server that communicates with the object storage, and the monitoring process executes on the backup server during the backups.

* * * * *